United States Patent [19]

Nishio et al.

[11] Patent Number: 4,738,085
[45] Date of Patent: Apr. 19, 1988

[54] ROTARY CUTTER FOR MOWERS

[75] Inventors: Tadashi Nishio; Mitsuo Osakabe; Keizo Shimizu; Akihiro Sonoda, all of Tokyo, Japan

[73] Assignee: Starting Industry Company Limited, Tokyo, Japan

[21] Appl. No.: 867,502

[22] Filed: May 28, 1986

[30] Foreign Application Priority Data

Apr. 22, 1986 [JP] Japan ............................ 61-93144
Apr. 22, 1986 [JP] Japan ........................ 61-60752[U]

[51] Int. Cl.$^4$ ............................................ A01D 34/67
[52] U.S. Cl. .................................... 56/12.7; 30/276; 56/294
[58] Field of Search ..................... 56/12.7, 294, 295; 30/276, 347

[56] References Cited

U.S. PATENT DOCUMENTS

| 4,195,408 | 4/1980 | Palmieri | 56/12.7 X |
| 4,242,797 | 1/1981 | Palmieri et al. | 56/12.7 X |
| 4,566,189 | 1/1986 | Muto | 30/276 |
| 4,584,771 | 4/1986 | Tillotoon | 56/12.7 X |
| 4,625,501 | 12/1986 | Baba | 56/12.7 X |
| 4,640,084 | 2/1987 | Baba | 56/12.7 X |

Primary Examiner—George A. Suchfield
Attorney, Agent, or Firm—William J. Daniel

[57] ABSTRACT

A rotary cutter head for use with a rotating filament trimmer in which a reel for winding cords or filaments is held between a housing covering a lower portion thereof and a retainer or hub fixed on the driven rotating shaft of the trimmer unit and is rotatably disposed within the housing. Within the bore of the reel, an axially movable slider is normally biased toward the retainer by the elastic force of a spring so that meshing engagement occurs between a peripheral array of axially projecting tongues formed on one end of the slider and a plurality of radial teeth-like ribs formed on the inner side of the retainer and establishes a driving connection to rotate the reels. By applying an axial impact against the housing, the slider is moved axially by inertial forces against the biasing force of the spring to release that engagement, and axially projecting detent fingers formed around the other end of the slider press against the opposed slopes of a circular rib formed on the inner side of the housing and bring about both positive relative rotation of the reel and fix a limit to such rotation to a predetermined amount thereby to play out a limited length of fresh cords. In order that the reel may rotate in an opposite direction to rewind the cords, moreover, the radial ribs formed on the retainer and the tongues of the slider are formed with opposed cooperating cam slopes which force the slider axially until the tongues are clear of the ribs during backward rotation.

5 Claims, 4 Drawing Sheets

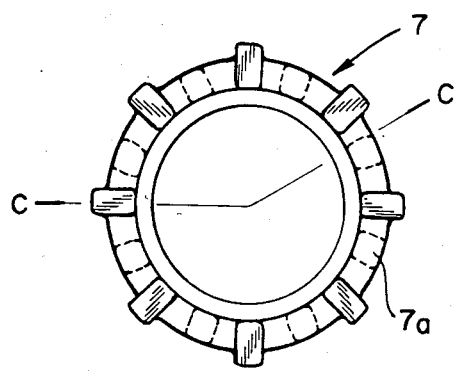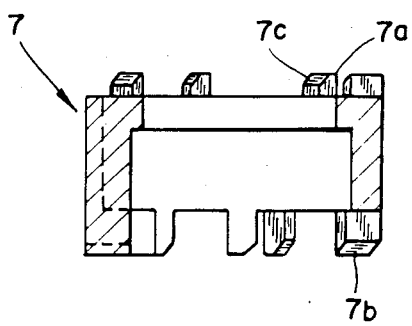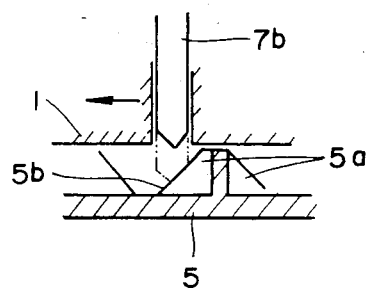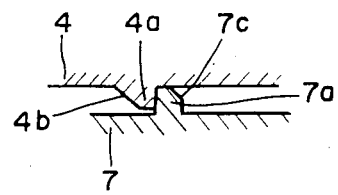

ROTARY CUTTER FOR MOWERS

BACKGROUND OF THE INVENTION

1. Field of the Invention

The present invention relates to a rotary trimmer for trimming grass or the like and, more particularly, to a rotary cutting head to be used with the trimmer for cutting the grass with cutting cords or lines extending radially outwardly of a housing which is rotatably driven through a rotating shaft by a motor.

2. Description of the Prior Art

There has been proposed in the prior art a trimmer of the type in which cords (or cutting lines) are found on a supply reel with the free end projecting radially for cutting contact with the plants, e.g., grass or weeds, to be cut upon bodily rotation of the reel. When the exposed length of cords becomes worn, a fresh length is pulled out from the reel by stopping the engine and by disassembling a portion of a trimmer mechanism or loosening retaining screws. As another cord replenishing technique, a push member for moving the reel in the axial direction is attached to the lower end of a cutter head mounting shaft and is depressed axially durings its rotation to move the reel so that the reel and the housing are brought out of phase by the centrifugal force of the cords to play out the required length of cord, as is disclosed in Japanese Patent Laid-Open No. 57-5608.

In the rotary trimmer having the construction according to the prior art, however, it is awkward to play out the cords. When the cords happen to be extended more than necessary during assembly or use, moreover, the excessively long cords cannot be drawn back into the assembly head unless the head is again disassembled, because the reel cannot be accessed from outside the head housing. This makes it necessary to either cut away the excess cord portions and thus waste the same or to disassemble the rotary cutter head. The second prior art technique has the drawback that the depression of the push member during use for feeding the cords radially of the cutter head causes the free ends of the cords to drop down, thereby increasing the danger of scattering stray pebbles or the like and that the presence of the push member raises the height of the cords from the ground and accordingly the effective cutting level of the cords.

SUMMARY OF THE INVENTION

It is, therefore, an object of the present invention to provide a rotary trimmer which is free of the above-specified drawbacks characterizing the prior art.

In a rotary cutter head for use with a rotary trimmer using cords, according to the present invention, a supply reel for trimmer cord wound thereon is rotatably fitted in a casing which is defined by both a housing confining the reel and a retainer or hub fixed on a driving shaft rotating in a working direction, and a slider is so fitted in the reel that it can move exclusively in the axial direction relative to the shaft and reel. Axially projecting tongues formed at one end of the slider and teeth-like radial ribs formed on an adjacent face of the hub are normally held by a biasing spring in engagement so that the reel rotates as a unit with the casing in the working direction. By applying a downward axial impact to the casing, i.e., away from the hub face, the slider is caused to move in the axial direction by inertia against the biasing force of the spring thereby disengaging the slider tongues from the retainer ribs but at the same time bringing the other axial fingers at the end of the slider into engagement with a circular rib formed on the interior of the housing and having cam-like slopes so that the angular relationship between the housing and the reel may be changed to bring the reel out of phase by a predetermined amount in the rotational direction with respect to the housing.

According to the present invention, moreover, the radial teeth-like ribs are formed on the hub to allow the reel to rotate in the opposite direction to wind the cords, and the tongues of the slider are formed at their opposed faces with slopes which shift the slider axially when the reel is rotated opposite to the working direction.

The rotary cutter head attached to the rotating shaft of the mower body cuts the grass or weeds by means of cords pulled out to a suitable length. When the cords become short by wear, the slide is caused to move toward the housing by the inertia force against the spring action as a result of the housing being bumped on the ground. Consequently, the tongues of one end of the slider are brought out of meshing engagement with the ribs of the hub whereas the fingers at the other end of the slider come into abutment against the slopes of the circular rib of the housing so that the reel is momentarily rotationally driven by the slider to bring the reel and the housing out of phase thereby to allow the cords to be pulled out. When thus released, the reel is rotated through a predetermined arc by the centrifugal force of the cords to play out a fresh length of the cords. When the inertial force is gone, meshing engagement of the slider and the ribs of the retainer is restored by the spring so that the reel is rotated together with the hub and housing.

If the cords should be pulled out more than necessary for assembly or use, the slider and reel themselves can be rotated backwards, i.e., opposite to the working direction of rotation, until the slider tongues come into abutment with the next rib, since the reel is exposed to the outside from the casing through an access opening and can be turned by hand. If this backward rotation is continued forcibly in this way, the slider is developed axially against the spring action by the engagement of the cam-like slopes formed on the backside of the tongues with the teeth-like ribs until the tongues move clear of the next ribs and meshing engagement is reestablished by the return of the spring. This makes it possible to rewind the cords on the reel.

By lightly tapping the cutter head on the ground even if the cutter head is in operation, according to the present invention, the cords can be fed out length by length without any danger. Since the reel is held immovable in the axial direction, moreover, the feeding operations occur smoothly without shifting the reel axially back and forth. Since the push or bumper member of the prior art is eliminated, moreover, the cords can advantageously be positioned closer to the ground. Thus, the rotary cutter of the present invention can be operated easily and safely by the simplified structure. Since the reel is partially exposed to and accessible from the outside and since the reel is made rotatable in the cord rewinding or backwards direction, furthermore, the cords can be simply wound by turning the reel even if they are pulled out more than necessary for assembly or use. Furthermore, this assembly itself is simplified because the cords can be wound on the reel after the rotary head and reel have been assembled. Thus, according to the present invention, it is advantageously possible to provide an inexpensive, convenient rotary cutter head.

BRIEF DESCRIPTION OF THE DRAWINGS

FIGS. 5(a) and 5(b) are a bottom view showing a slider and a section taken along line C—C of FIG. 5(a), respectively;

FIG. 6 is a section taken along line C—C of FIG. 4; and

FIG. 7 is a section taken along line D—D of FIG. 3.

DESCRIPTION OF THE PREFERRED EMBODIMENT

Figure 1:
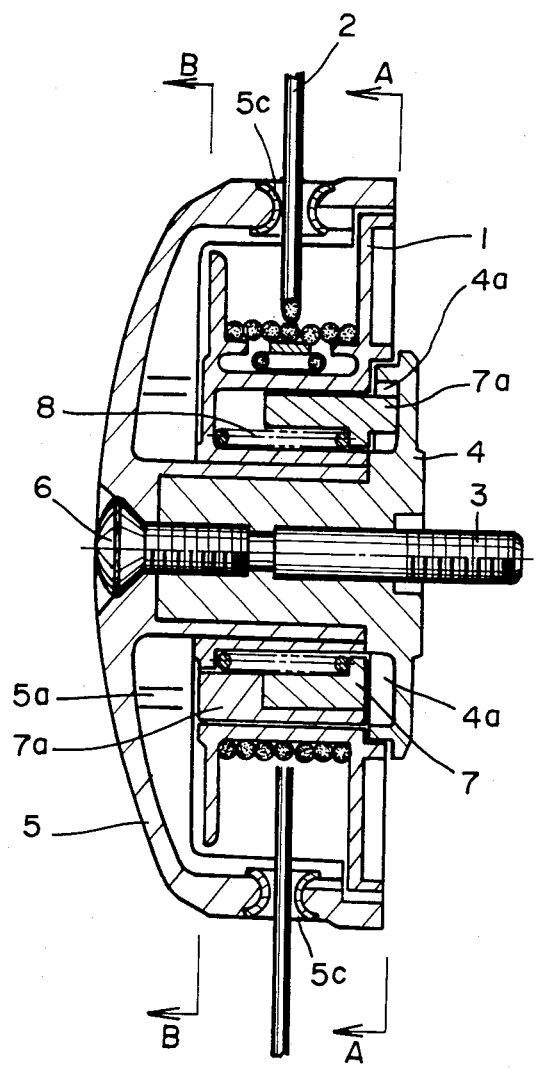
FIG. 1 is a sectional view showing one embodiment of the rotary cutter according to the present invention.
Figure 2:
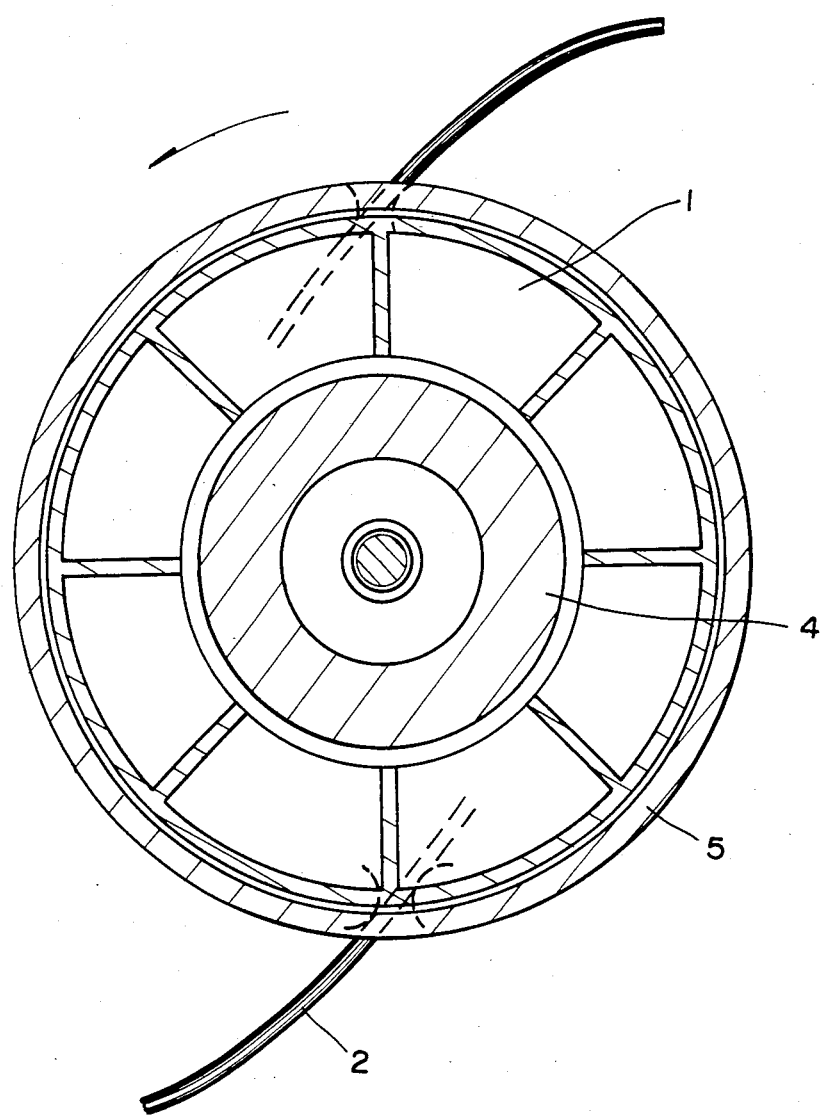
FIG. 2 is a top plan view showing the same.
Figure 3:
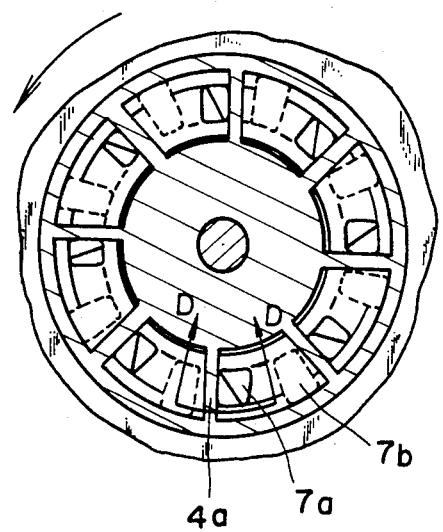
FIG. 3 is a section taken along line A—A of FIG. 1.
Figure 4:
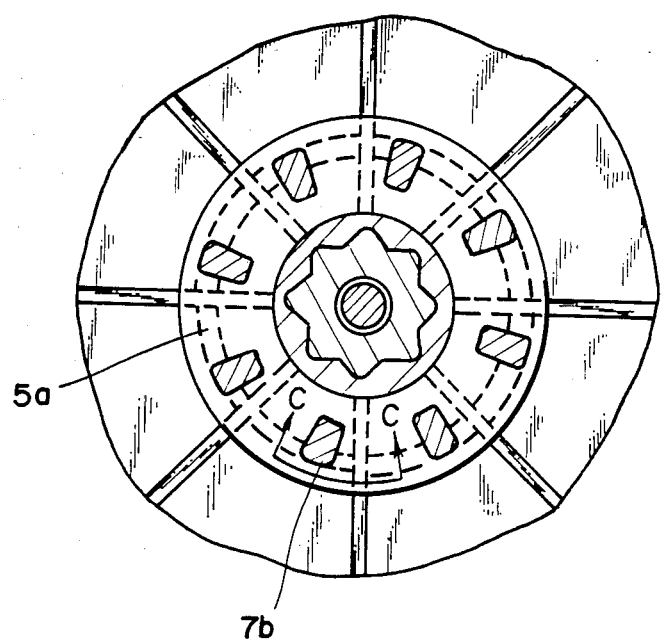
FIG. 4 is a section taken along line B—B of the same figure.

Denoted at reference numeral 1 in the accompanying drawings is a reel which has an accommodating portion for winding cutting filaments (or cords) 2 thereon. This feel 1 is rotatably held between a retainer or hub 4 having a screw 3 anchored therein for attachment to a driven rotating shaft (not shown) of the overall trimming unit and a housing 5 enclosing the reel 1. Incidentally, the cords 2 are wound on the reel in a direction opposed to their rotating direction. On the other hand, the retainer 4 and the housing 5 are so interlocked (as shown in FIG. 4) and detachably secured together by means of a bolt 6 that their positional relationship is always fixed. Denoted at numeral 7 is a slider which is used to change the positional relationship between the housing 5 and the reel 1. As better seen from FIGS. 5(a) and 5(b), the slider 7 is formed into a cylindrical or sleeve shape carrying at its one end adjacent hub 4 a plurality of tongues 7a having slopes 7c on their backside. Tongues 7a are arranged around slider 7 at respectively constant angular spacings around the slider axis. On the other hand, the retainer or hub 4 is formed on its inner face with a plurality of radial teeth-like ribs 4a having cam slopes 4b for cooperation with the tongues 7a. The other end of slider 7 carries a peripherally spaced array of detent fingers 7b projecting axially therefrom and in out of phase relation with the peripheral positions of tongues 7a. Housing 5 carries on its inner face a circular rib 5a having slopes 5b positioned to correspond to the projections 7b, as shown in FIG. 6. Moreover, the ribs 4a of the retainer or hub 4 and the tongues 7a of the slider 7 are normally biased into engagement at all times by the force of a spring 8 as to mesh with each other. The slider 7 is free to move in the axial direction toward the housing 5. The housing 5 is formed with a pair of apertures 5c through which the paired cords 2 are axially fed out. As a result, if the housing 5 is impacted by a force applied axially against the housing 5, the slider 7 is shifted in the axial direction against the biasing force of the spring 8 until its projections 7b engage the slopes 5b (as better seen from FIG. 6) of the circular rib 5a of the housing 5. This releases the reel 1 to rotate out of phase from its initial position by a predetermined arc with respect to the housing and hub 4 so that the cord 2 will be played out a corresponding length.

Incidentally, as shown in FIG. 7, the slopes 4b of the ribs 4a of the retainer 4 and the slopes 7c of the tongues 7a of the slider 7 are located on opposite sides, where they contact each other during backward relative rotations, so that the reel 1 can rotate in the direction to rewind the cords 2.

Next, the operations of the rotary cutter head thus constructed will be described.

The rotary cutter head attached to the driven rotating shaft of the trimmer unit usually cuts off a lawn or weed by the cords 2 pulled out to a suitable length. If the cords 2 become short by wear, they have to be unwound and pulled out from reel 1 to restore their cutting effectiveness. If the housing 5 is tapped against the ground for purposes of that restoration, the slider 7 is moved axially toward the housing 5 against the biasing force of a compression spring 8 by the inertia force (as seen from FIG. 6). This movement releases the meshing engagement between the ribs 4a of the retainer 4 and the tongues 7a of the slider 7. Simultaneously, the leading ends of the detent fingers 7b of the slider 7 are brought into abutment against the slopes of the circular rib 5a of the housing 5 so that the slider 7 is forced to rotate relative to the housing and hut in a counterclockwise or forward direction (as indicated by arrow), as viewed in FIG. 6. Since the slider and reel rotate together, the reel 1 rotates relative to housing 5 to allow the cords 2 to be let off by the centrifugal force of the cords 2. After this, when the impact force is over, the slider 7 is instantly returned to starting axial position by the biasing force of the spring 8 to restore the meshing engagement between the tongues 7a of the slider 7 and the next ribs 4a of the array on the retainer 4 with the slider and reel being advanced one pitch at a time. At this point, the detent fingers 7b of the slider 7 are cammed away by the circular rib 5a of the housing 5 so that the slider 7 is restored positively to its initial position without fail.

If the cords are accidentally pulled out more than necessary for assembly or use, the reel can be manually accessed through one annular opening between the periphery of the hub 4 and the radially spaced periphery of the housing 5 and turned in the rewinding direction of the cords 2. During such backward turning of the reel, the tongues 7a of the slider 7 are shifted axially against the biasing force of the spring 8 by the cooperative camming action their slopes 7c and the slopes 4 of the ribs 4a. Once the tongues are clear of these ribs 4a, they are restored to their meshing engagement with the ribs 4a after a one-step relative rotation by the action of the spring 8. This makes it possible to wind the cords 2 on the reel 1 by repeating the sequence as many steps of rotation as may be required.

What is claimed is:

1. A rotary head for a rotating filament trimmer comprises a rotary driven hub adapted to be engaged to a driving element at one end and having a peripheral flange adjacent the engaged end; a housing detachably fixed on said hub for rotation therewith, said housing having a generally disk-shaped end wall in axial spaced relation to the hub flange and a generally cylindrical side wall extending from the end wall periphery toward said hub flange and terminating in a free end edge in radially spaced relation to said hub flange periphery, said hub and housing defining therebetween a recess having an annular end opening between said hub flange periphery and the free end edge of the housing side wall; a filament supply reel fitting within said recess around said hub for independent rotation relative to said hub and housing and having an end thereof accessible through said annular end opening; and spring-biased ratchet-and-pawl coupling means between said hub and said reel preventing relative rotation between said hub and reel in the direction in which said hub is driven and permitting free relative rotation of said reel in the opposite direction, whereby said reel can be engaged manually through said recess end opening and rotated independently in said opposite direction of rotation to rewind any excess length of unwound filament.

2. The rotary head of claim 1 wherein said ratchet-and-pawl coupling means comprises a sleeve mounted on said hub for free relative rotation and limited axial movement, means connecting said sleeve and reel for rotation together, an array of radially spaced teeth on the face of the hub flange toward the reel-receiving recess, at least one tongue projecting axially from the end of said sleeve into engagement with one of the array of teeth on the flange face in the driven direction of rotation, cam means on one of each such sleeve tongue and the teeth of said teeth array effecting disengagement of each such sleeve tongue and such teeth by axial displacement of the sleeve and tongue and consequential relative rotation upon said opposite direction of rotation, and spring means biasing the sleeve axially toward the hub flange face.

3. A rotary head for a rotating filament trimmer comprises a rotary driven hub adapted to be engaged to a driving element at one end; a housing detachably fixed on said hub for rotation therewith, said hub and housing defining therebetween a recess; a filament supply reel fitting within said recess for independent rotation relative to said hub and housing, said reel having a central bore fitting around said hub; means on said hub and housing for preventing relative axial movement of said reel; and coupling means between said hub and said reel for normally preventing relative rotation between said hub and reel in the direction in which said hub is driven and permitting relative rotation of said reel in response to the application of inertial forces to said head, said coupling means comprising an array of radially spaced teeth axially projecting on said hub; a sleeve mounted on said hub within the reel bore for free rotation and limited axial displacement relative to said hub; means connecting said sleeve and reel for rotation together while permitting limited axial displacement of said sleeve, at least one tongue projecting axially from one end of said sleeve for engagement with a tooth on said hub to prevent realtive rotation of the sleeve and hub in the driven direction of said hub, and spring means biasing said sleeve axially to place such tongue in engagement with said hub tooth, said sleeve being displaceable against the spring-biasing forces in an axial direction away from said sleeve end in response to inertial forces acting thereon in that axial direction to thereby temporarily release such tongue from such tooth and thus permit relative reel rotation to unwind an additional length of filament from said reel.

4. The rotary head of claim 3 including at least one axially projecting detent finger carried on the end of said sleeve opposite said tongue and displaceable axially with said sleeve; and an array of axially projecting radially spaced stop means provided on the face of said housing toward said recess and cooperating with the detent finger when the latter is displaced axially with said sleeve to thereby limit the relative rotation of the sleeve and reel about said hub when such tongue is released from such hub teeth.

5. The rotary head of claim 3 including cam means on one of such tongue and the teeth of said array effecting disengagement of said tongue and teeth by axial displacement of said tongue and sleeve upon relative rotation of said sleeve and reel in said opposite direction of rotation, said housing having an access opening thereon for manual access to said reel to rotate the same in said opposite direction.

* * * * *